Sept. 5, 1967

KUNITOSHI TEZUKA 3,339,905

APPARATUS FOR SEPARATING FERROUS AND NON-FERROUS METALS
OF A USED CAR OR THE LIKE FROM EACH
OTHER AND RECOVERING THEM

Filed July 28, 1964

INVENTOR.
KUNITOSHI TEZUKA

BY George B. Oujevolk
Attorney

３,339,905
APPARATUS FOR SEPARATING FERROUS AND NON-FERROUS METALS OF A USED CAR OR THE LIKE FROM EACH OTHER AND RECOVERING THEM
Kunitoshi Tezuka, 34, 7 Minami Sunamachi, Koto-ku, Tokyo-to, Japan
Filed July 28, 1964, Ser. No. 385,612
3 Claims. (Cl. 266—33)

ABSTRACT OF THE DISCLOSURE

A device for successively melting out the various metals from scrap automobiles including a furnace within which the automobile is rotatably mounted by means of opposed plates containing spikes. As the vehicle rotates, the temperature is increased by a heating device in successive stages wherein the melted metal will fall downwardly and can be withdrawn through a bottom door.

---

This invention relates to an apparatus for separating ferrous and non-ferrous metals of a used car or the like from each other and recovering them.

In the prior art, separation and collection of ferrous and nonferrous metals contained in an alloy has been performed according to a method which comprises providing a condensing surface having temperature gradients in a vacuum chamber, heating composition metals contained in an alloy up to temperatures sufficient to evaporate said composition metals, enabling each of the vaporized metals to be condensed at positions of different temperature range on said surface having temperature gradients, and recovering the metals condensed on said surface by stripping off the same from the said surface. However, this conventional method is not commercially profitable since a large amount of money is required for the construction of a vacuum chamber and a relatively long period of time is required for effecting the evaporation. Further, the aforementioned conventional method does not find common use since the separation and collection can not be efficiently and quickly carried out. Consequently, in spite of the fact that there is an ever increasing number of used cars resting in junkyards, recovery of metals of used cars or the like which can be reutilized as valuable production materials has not been extensively practiced.

In order to solve such problems, it is the purpose of this invention to provide a simplified apparatus for separating ferrous and nonferrous metals contained in an object such as a used car from each other by rotating the object in a heated chamber.

According to this invention, an object such as a used car is accommodated in a heating furnace and heated by means of a heating device such as a burner according to the melting point of the respective metals contained in the object. The heating temperature is gradually adjusted for melting the respective metals so that the ferrous and non-ferrous metals are separated from each other through rotation of the object and are then recovered.

Further, the apparatus of this invention is adapted for carrying out such separation and recovery in a simple but efficient manner, thereby meeting economic demands.

The accompanying drawings show an embodiment of the apparatus for separating ferrous and non-ferrous metals of a used car or the like from each other in accordance with the present invention, in which:

FIG. 1 is a longitudinal sectional view of an apparatus of this invention; and

FIG. 2 is a sectional view taken along line A—A of FIG. 1.

Referring to the accompanying drawings, reference numeral 1 represents a heating furnace provided with a heating device such as an oil burner 2. A sloping plate 3 is provided in the heating furnace 1, which furnace is provided on one side thereof with a door 5 for enabling a truck 4 to go in and out of the heating furnace and a door 6 for the melted metals to be withdrawn from the heating furnace. A truck 7 for withdrawing the melted metals is so disposed as to be positioned outside of door 6. The truck 4 is adapted for being upwardly and downwardly displaced through a suitable conventional mechanism. Reference numerals 8 and 9 represent holding plates provided with spikes for holding therebetween such an object 10 containing materials to be melted as a used car or the like. The holding plates are adapted to be retractable moved by means of a driving device 11 such as for example, an hydraulic cylinder. The object 10 held between the holding plates 8 and 9 is rotated by means of a prime mover 12 at a reduced speed through a reduction gear 13 mounted on a rotary shaft and cooperating therewith. Reference numeral 14 represents a bearing device, and reference numeral 15 represents a guide plate.

In the apparatus of this invention, the object 10 such as a used car or the like disposed on the object truck 4 is brought into the heating furnace 1, the position of the truck 4 is upwardly or downwardly adjusted so that the same is suitably held between the holding plates 8 and 9 having spikes, the door 5 is closed, and then the object 10 is heated by means of the heating device such as burner 2 and rotated by prime mover 12 through the reduction gear 13. Simultaneously, the furnace is uniformly heated by means of the heating device such as burner 2. Assuming that the temperature in the furnace has reached approximately 320° C., non-ferrous metals such as tin alloy, zinc alloy or the like contained in the cylinder, engine or the like are melted, and the rotation of the object causes the melted non-ferrous metals to be dropped from the object down onto the sloping plate 3. At a suitable time, the door 6 is closed, and the temperature is increased by continuing the heating until it reaches, for example, the melting point (650° C.) of copper which is higher than those of tin alloy, zinc alloy, lead alloy and the like. The melted copper is likewise separated from the object held between the holding plates, and dropped down onto the sloping plate 3 due to the rotation of said object. As each metal separates it is withdrawn through door 6 into a waiting truck 7.

As described above, the non-ferrous metals contained in the object are gradually separated from the ferrous metals and then withdrawn by repeating the aforementioned operation, so that only the ferrous metals are finally left in the object.

It will be understood that the temperature is gradually increased by means of the heating device according to the specific melting point of the respective non-ferrous metal, thereby recovered, which are in turn gradually melted and separated from the ferrous metals contained in the object are recovered. Further, the ferrous metals left in the object can be recovered simultaneously when the non-ferrous metals are separated therefrom.

The apparatus of this invention is simple in construction and operated in a simple manner, however, use of the same highly enhances the efficiency of the operation for separating ferrous and non-ferrous metals from each other which has been manually performed heretofore, thereby effecting quick separation and recovery, so that economic demands can be sufficiently met by supplying valuable production materials recovered from used cars presently lying in junk piles.

What I claim is:

1. An apparatus for separating ferrous and non-ferrous metals of a used car or the like from each other, comprising a heating furnace having a first door for enabling a used car to be placed in and later withdrawn from said furnace, a second door for withdrawing melted metals from said furnace, a pair of opposed car holding plates in said furnace each being provided on its inner face with a plurality of spikes, each of said holding plates being rigidly mounted on a separate shaft, said holding plate being adapted to hold a used car therebetween, means supporting said shafts for rotation, power means for axially retracting one of said shafts with respect to the other of said shafts, prime mover means for rotating one of said shafts, and adjustable heating means provided in said heating furnace wherein the used car containing metallic materials to be melted is heated, the heating being adjusted in increments according to the melting point of the respective material to be melted so that various metals are individually separated from said used car and dropped downwardly in said furnace due to the rotation of said car, thereby permitting recovery of said metals through said second door.

2. An apparatus as defined in claim 1 and further including reduction gear means mounted between said prime mover means and said one rotary shaft.

3. An apparatus as defined in claim 1 and further including a sloping plate within said furnace mounted below said holding plates for guiding melted metal in its fall to the bottom of said furnace adjacent to said second door.

References Cited
UNITED STATES PATENTS

| | | | |
|---|---|---|---|
| 1,938,239 | 12/1933 | White | 266—33 |
| 2,041,844 | 5/1936 | Lindner | 266—33 |

JOHN F. CAMPBELL, *Primary Examiner.*

M. L. FAIGUS, *Assistant Examiner.*